United States Patent
Allen et al.

(10) Patent No.: US 6,223,672 B1
(45) Date of Patent: May 1, 2001

(54) ULTRASHORT FAIRINGS FOR SUPPRESSING VORTEX-INDUCED-VIBRATION

(75) Inventors: Donald Wayne Allen, Katy; Dean Leroy Henning, Needville, both of TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 08/971,111

(22) Filed: Nov. 14, 1997

Related U.S. Application Data

(60) Provisional application No. 60/031,271, filed on Nov. 15, 1996.

(51) Int. Cl.[7] .................................................. F15D 1/10
(52) U.S. Cl. ................................ 114/243; 405/211
(58) Field of Search ........................... 114/243; 405/211

(56) References Cited

U.S. PATENT DOCUMENTS

| 2,949,090 | * | 8/1960 | Gerber | 114/243 |
|---|---|---|---|---|
| 3,410,096 | * | 11/1968 | Schuh | 114/243 |
| 3,572,041 | | 3/1971 | Graaf | 61/46.5 |
| 4,171,674 | | 10/1979 | Hale | 114/243 |
| 4,398,487 | | 8/1983 | Ortloff et al. . | |
| 4,439,070 | | 3/1984 | Dimmick | 405/216 |
| 4,474,129 | | 10/1984 | Watkins et al. . | |
| 5,410,979 | | 5/1995 | Allen et al. . | |
| 5,421,413 | | 6/1995 | Allen et al. | 166/335 |
| 5,722,340 | | 3/1998 | Sweetman | 114/243 |

OTHER PUBLICATIONS

F. Joseph Fischer and Warrant T. Jones, "Practical Experiences with Flow–Induced Vibrations," Symposium Karlsruhe/Germany, Sep. 3–6, 1979, University of Karsruhe, pp. 570–580.

* cited by examiner

*Primary Examiner*—Sherman Basinger

(57) ABSTRACT

An ultrashort fairing is disclosed for suppressing vortex-induced vibration in substantially cylindrical marine elements. The ultrashort falling has a leading edge substantially defined by the circular profile of the marine element for a distance following at least about 270 degrees thereabout and a pair of shaped sides departing from the circular profile of the marine riser and converging at a trailing edge. The ultrashort fairing has dimensions of thickness and chord length such that the chord to thickness ratio is between about 1.20 and 1.10.

17 Claims, 5 Drawing Sheets

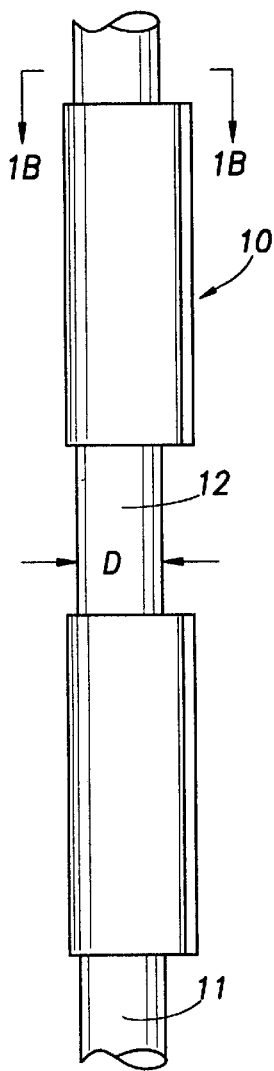
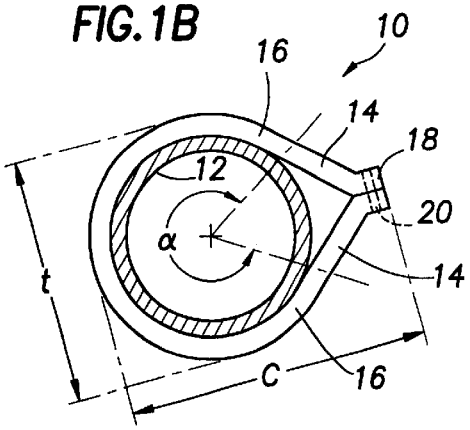
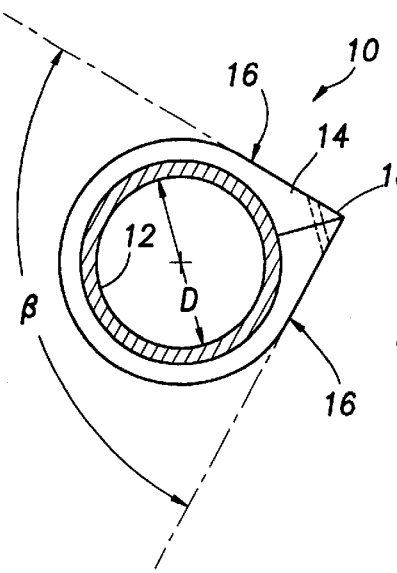
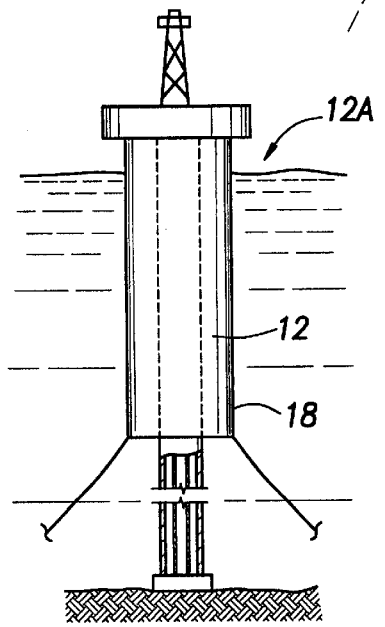
FIG. 1A
FIG. 1B
FIG. 2
FIG. 3

FIG.4A
FIG.4B
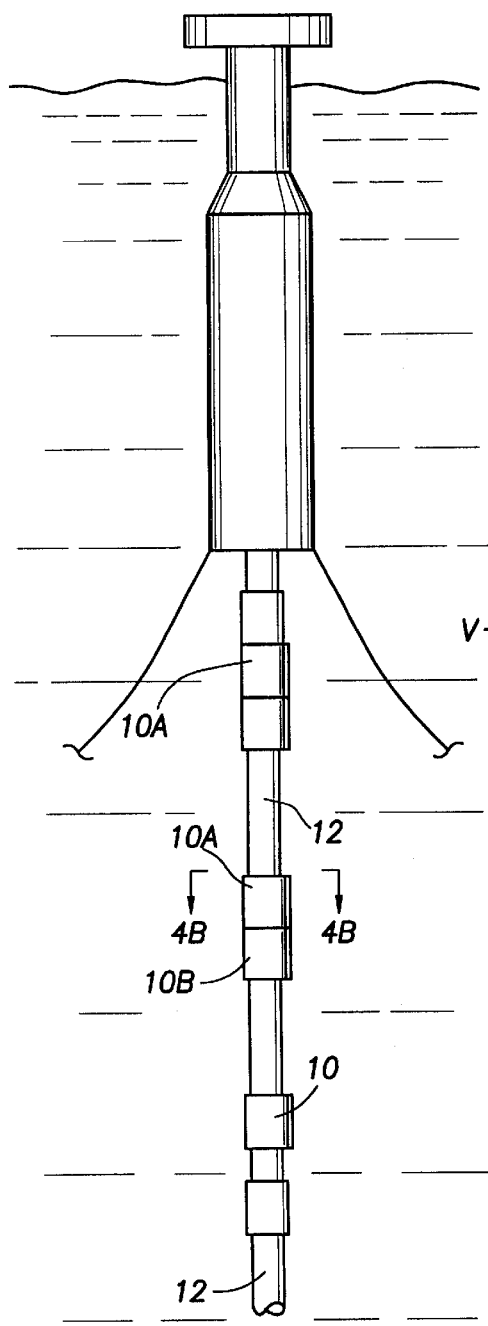
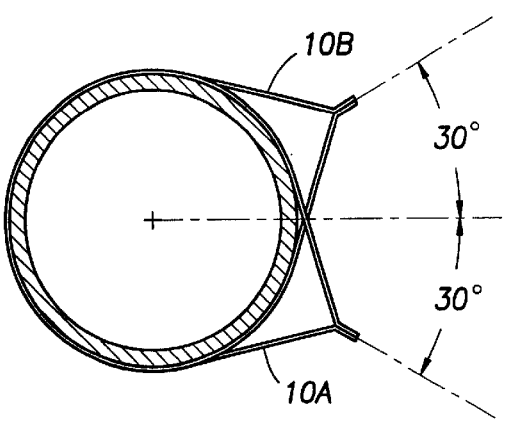

ULTRASHORT FAIRINGS FOR SUPPRESSING VORTEX-INDUCED-VIBRATION

RELATED APPLICATIONS

This application claims priority to provisional application No. 60/1031,271 filed Nov. 15, 1996.

BACKGROUND

The present invention relates to a method and apparatus for reducing vortex-induced-vibrations ("VIV") and, more particularly, reducing VIV in marine environments by the use of fairings.

Production of oil and gas from offshore fields has created many unique engineering challenges. One of these challenges is dealing with effects of currents on fixed cylindrical marine id elements. Such marine elements are employed in a variety of applications, including, e.g., subsea pipelines; drilling, production, import and export risers; tendons for tension leg platforms; legs for traditional fixed and for compliant platforms; cables and other mooring elements for deepwater platforms; and, although not conventionally thought of as such, the hull structure for spar type structures. These currents cause vortexes to shed from the sides of the marine elements, inducing vibrations that can lead to the failure of the marine elements or their supports.

For short cylindrical elements that are adjacent convenient means for secure mounting, the marine elements and their supports can be made strong enough to resist significant movement by the forces created by vortex shedding. Alternatively, the marine element could be braced to change the frequency at which the element would be excited by vortex shedding.

However, strengthening or bracing becomes impractical when the application requires that the unsupported segments of the marine element extend for long runs. Deepwater production risers, drilling risers, platform export risers, import risers bringing in production from satellite wells, tendons for tension leg platforms, and other conduits for produced fluids and deepwater mooring elements formed from tubular goods are typical of such applications. These pipes and tubular goods serve as marine elements in applications that are difficult or impossible to brace sufficiently to satisfactorily control vibration induced by vortex shedding. Subsea pipelines which traverse valleys on the ocean floor can also be unsupported for extended lengths and provide another example.

Shrouds, strakes and fairings have been suggested for such applications to reduce vortex induced vibrations. Strakes and shrouds can be made to be effective regardless of the orientation of the current to the marine element. But shrouds and strakes are generally less effective than fairings. Fairings are generally very effective in reducing vibrations due to vortex shedding, and also reduce drag forces on the marine element. Until recently, however, fairings have been thought to be effective only if the relative direction of the current is parallel to the axis of the fairing.

U.S. Pat. Nos. 4,398,487 and 4,474,129 disclose conventional, long fairings for use with subsea pipes and risers which are provided with means to permit the fairing to rotate around the pipe or riser as would a weathervane in order to maintain an orientation presenting the fairing parallel to the current. Accommodating this constraint results in an expensive apparatus.

Further, the subsea environment in which the fairings must operate renders likely the rapid failure of the rotational elements. Traditional fairings present a chord to thickness ratio greater than two and present a very serious problem should corrosion or marine growth cause the rotational elements to seize up. Such a failure of the fairing to rotate would cause excessive drag forces on the marine element should the current shift and no longer align with the "frozen" fairing. As a result, rotatable fairings have, in actual practice, been limited to drilling riser applications in which the risers (together with fairing mounted thereon) are frequently and routinely retrieved and not left in service for extended periods.

U.S. Pat. No. 5,410,979 represents a significant breakthrough in providing for fixed, short fairings. Even so, short fairings having a maximum ratio of length to width (cylinder diameter) of from 1.5 to as low as about 1.25 still drive cost and otherwise limit application. This length to width ratio, as a practical matter, translates to about a 1.20 minimum chord to thickness ratio for these short fairings.

These limitations are particularly constraining in the case of large diameter marine elements, such as spar hulls, which have conventionally been considered unsuitable for fairings, yet are subject to VIV problems as moored at the distal end of long tethers and/or mooring lines which provide no suitable means for bracing support.

Thus there remains a need for improved fairings that are effective to reduce vibration of a substantially cylindrical marine element caused by vortex shedding. An advantage of the ultrashort fairings of the present invention is less material is used and that the material requirements are relaxed with the shortening of the fairing and the reduced drag effects on fixed fairings. Another advantage of ultrashort fairings is that they facilitate pipe handling in substantially conventional manners not permitted with longer fairings. Further, in non-conventional fairing applications, e.g., spar hulls, ultrashort fairings enable enhanced practical application. Other embodiments may also benefit from new practicality in forming the walls of marine elements in a shape including an ultrashort fairing profile. Further, ultrashort fairings can increase effective VIV suppression across a wider range of angles of attack. Other deployment of embodiments of the present invention provide fixed fairings of sufficiently limited drag to enable an array of fixed fairing orientations to be simultaneously deployed on a single marine element to broaden the environmental conditions that will meet adequate VIV suppression.

SUMMARY OF THE INVENTION

The present invention is an ultrashort fairing for suppressing vortex-induced vibration of a substantially cylindrical marine element. The ultrashort fairing has a leading edge substantially defined by the circular profile of the marine element for a distance following at least 270 degrees thereabout and a pair of shaped sides departing from the circular profile of the marine riser and converging at a trailing edge. The ultrashort fairing has dimensions of thickness and chord length such that the chord to thickness ratio is between about 1.20 and 1.10.

Another aspect of the present invention is a method for protecting a substantially cylindrical marine element from vortex-induced-vibration over an extended range of angles of attack by installing a plurality of ultrashort fairings about the marine element in a non-rotative manner so as to secure the ultrashort fairings in an array of orientations along the axis of the marine element.

BRIEF DESCRIPTION OF THE DRAWINGS

The brief description above, as well as further objects and advantages of the present invention, will be more fully appreciated by reference to the following detailed description of the preferred embodiments which should be read in conjunction with the accompanying drawings in which:

FIGS. 1A and 1B are, respectively, side and top elevational views of the ultrashort fairing of the present invention;

FIG. 2 is a top elevational view of an alternate embodiment of the present invention in which the ultrashort fairing has no tail;

FIG. 3 is a side elevational view of a spar having an hull formed in the shape of an ultrashort fairing;

FIGS. 4A and 4B are, respectively, side and top elevational views of a deployment of a marine element having a plurality of fixed ultrashort fairings at a range of orientations;

Figure 5:
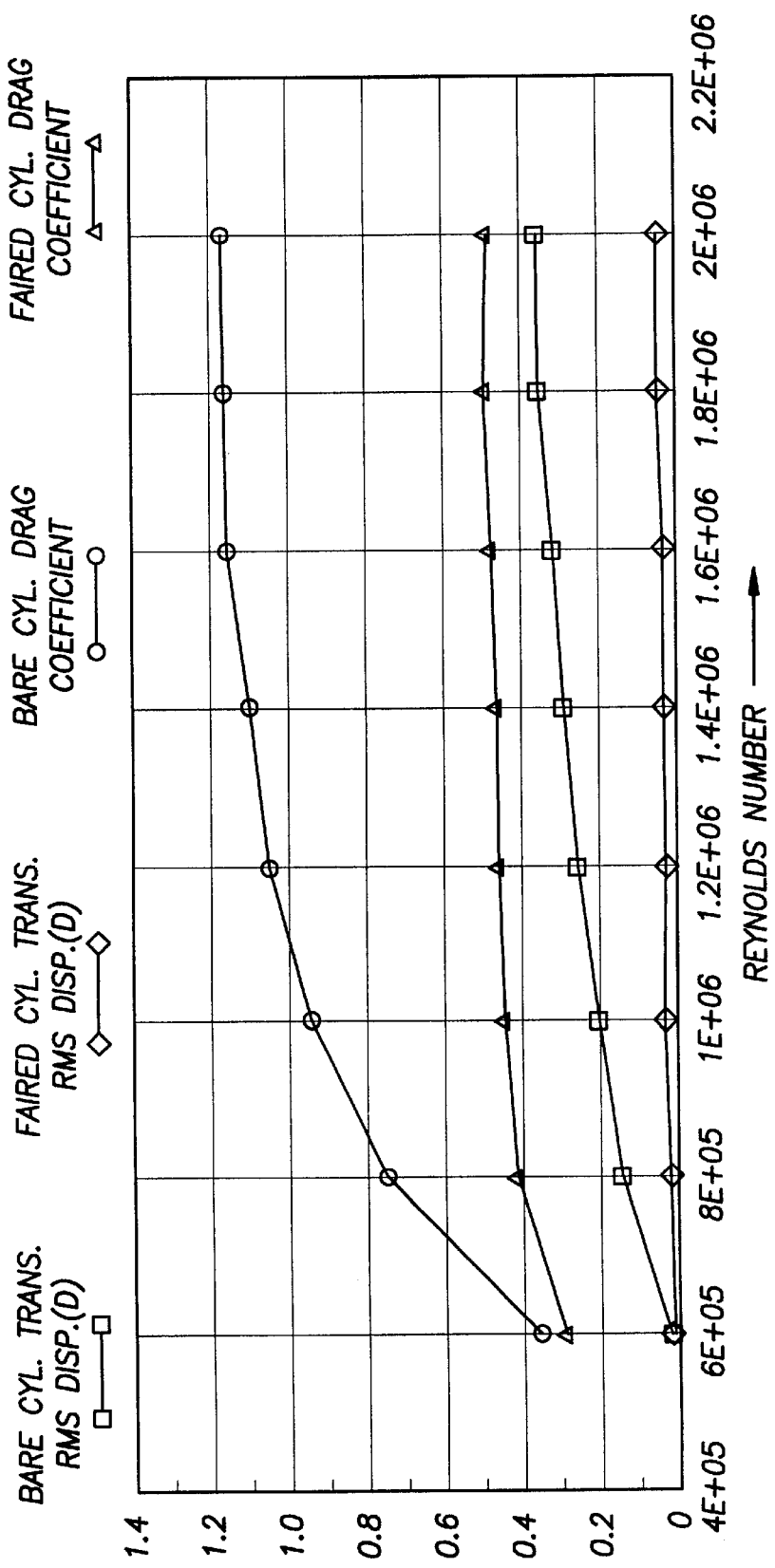
FIG. 5 is a graph of transverse RMS displacement and drag coefficient against Reynolds number for a 0 degree angle of attack.

A DETAILED DESCRIPTION OF
ILLUSTRATIVE EMBODIMENTS

FIGS. 1A and 1B illustrate two views of a fairing of the present invention. Here an ultrashort fairing 10 surrounds a substantially cylindrical marine element 12, such as riser 11. The marine element has an outside diameter D. The ultrashort fairing wraps about the exterior of marine element 12, substantially tracking the exterior for about 270 degrees or more as illustrated by angle alpha in FIG. 1B. The sides 14 of the fairing depart from following the exterior of the normal cylindrical surface of the marine element at points of departure 16 to converge at the beginning of tail 18. This convergence will be at an angle beta which will be about 90 degrees or more in an ultrashort fairing. See FIG. 2. Sides 14 may be straight, curve convexly, curve concavely, or converge in combinations thereof. When approaching from a concave curve, sides 14 will transition more gradually into tail 18, defining its angle of convergence beta ahead of this transition zone.

Ultrashort fairings 10 of the embodiment of FIGS. 1A and 1B are formed from a flat sheet of material, wrapped around the marine element, and connected in tail 18 with fasteners 20. The fasteners can be rivets, bolts with lock nuts, clips, snaps or welding operations. Alternatively, an edge of the fairing can be folded over and crimped onto the outer edge of the fairing after the fairing has been wrapped around the marine element. Here the fairing is held in a fixed position to prevent rotation by friction. Alternatively, the fairing may be secured by a positive engagement, e.g., by a clamp. Further, it should be noted that auxiliary flowlines, e.g., umbilicals, run parallel to the main marine element may be enclosed or partially enclosed by the tail of the fairing.

FIG. 2 illustrates an alternate embodiment of an ultrashort fairing 10, this time with no tail. Here sides 14 of the fairing wrap around marine element 12 to point of departure 16 which is observed on the exterior surface of the fairing to converge at an angle beta. However, in this embodiment the fairing is formed from a neutrally buoyant material and the inner surface of the ultrashort fairing 10 remains in contact with marine element 12 past point of departure 16 and for 360 degrees. In another alternative, the fairing could be formed into a triangular shape, and fastened to the marine element by straps or the like.

Another advantage of ultrashort fairings is their ease of handling. For instance, drilling riser applications require regular and routine "tripping" of the riser. Ultrashort fairings may be tripped through the moon pool with relatively few adjustments to conventional pipe handling techniques. In some such applications it may even be possible to leave the ultrashort fairings in place about the tubular goods being retrieved.

The height of the fairing can vary considerably depending upon the specific application, the materials of construction, and the method employed to install the fairing. In extended marine elements, numerous fairings are placed along the length of marine element 12. Although the entire length of the tubular could be covered with ultrashort fairings 10, this will usually not be necessary and covering only about ⅛ to ½ of the length of the marine element with the fairings will result in significant VIV suppression.

Figure 6:
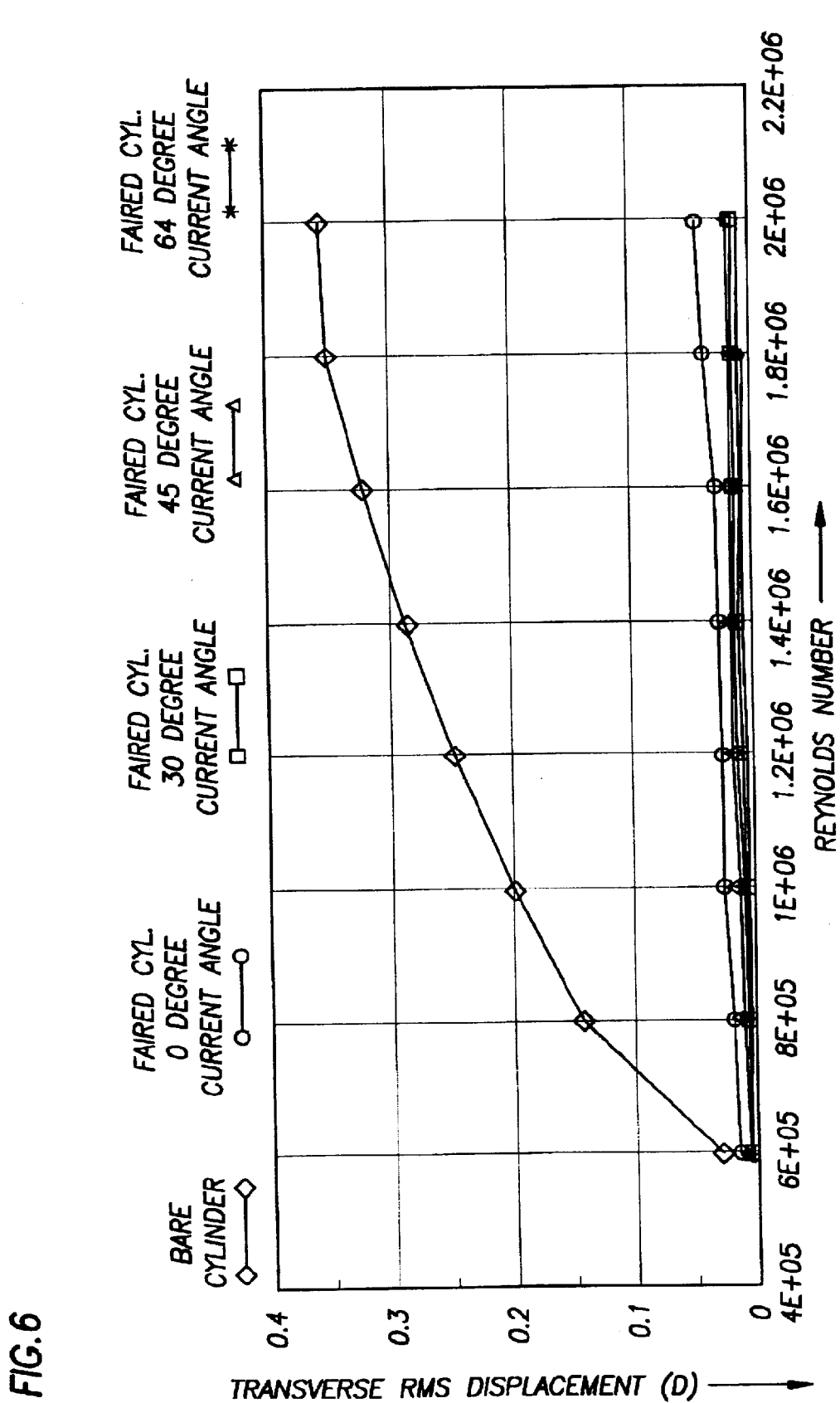
FIG. 6 is a plot of transverse acceleration for ultrashort fairings of the present invention as a function of current Reynolds number for flow at various angles to the axis of the fairing.

FIG. 6 is a plot of transverse acceleration for ultrashort fairings as a function of current Reynolds number for water flow at various angles to the axis of the fairing. The ultrashort fairings held their effectiveness up to an angle at least 64 degrees without any significant degradation, whereas "short" fairings were subject to performance degradation from about 56 degrees. As with short fairings, the ultrashort fairings were found not to cause significantly more vibration than bare pipe when not aligned within their effective range for angle of attack. In fact, this performance also improves with the ultrashort fairing. Fatigue failure, e.g., in risers, would thus not be exacerbated by placing ultrashort fairings all in fixed orientation to normally prevailing currents. Because fatigue failure due to VIV is generally only expected to occur after extended periods of time, some exposure to currents from directions outside the effective range of plus or minus 64 degrees from the falling orientation should be tolerable for many applications.

Nevertheless this issue can be addressed as illustrated in the deployment of ultrashort failings in FIGS. 4A and 4B. Here extended marine element 12 is a production riser leading to a mini-spar. The riser carries a plurality of ultrashort fairings 10 fixed in alternating orientations that suppress VIV from a wider range of directions, e.g., suitable to suppress VIV from a breakaway loop current that may, depending upon how it hits the prospect, present currents significantly deviated from the prevailing current. The ultrashort failings that happen to be properly aligned to suppress VIV from this event can be effective even though they are interspersed with non-aligned fairings and cover only a small portion of the total expanse. Further, the ultrashort fairings which are not aligned within effective orientation to the current pose little problem in that the drag is so low for the ultrashort fairings.

FIG. 3 illustrates another application of ultrashort fairing 10. Here, the fairing, itself, forms the hull of a spar 12A which is marine element 12. Hull diameters vary with design, but present designs have ranged as high as to the order of 120 feet. Even so, ultrashort fairings have been shown to be effective for the very high Reynolds numbers typical of structures of this magnitude. The shortness of the fairing facilitates hull fabrication and the extremely low drag to non-aligned current makes the use of a fixed fairing practical on this large a scale.

Figure 7:
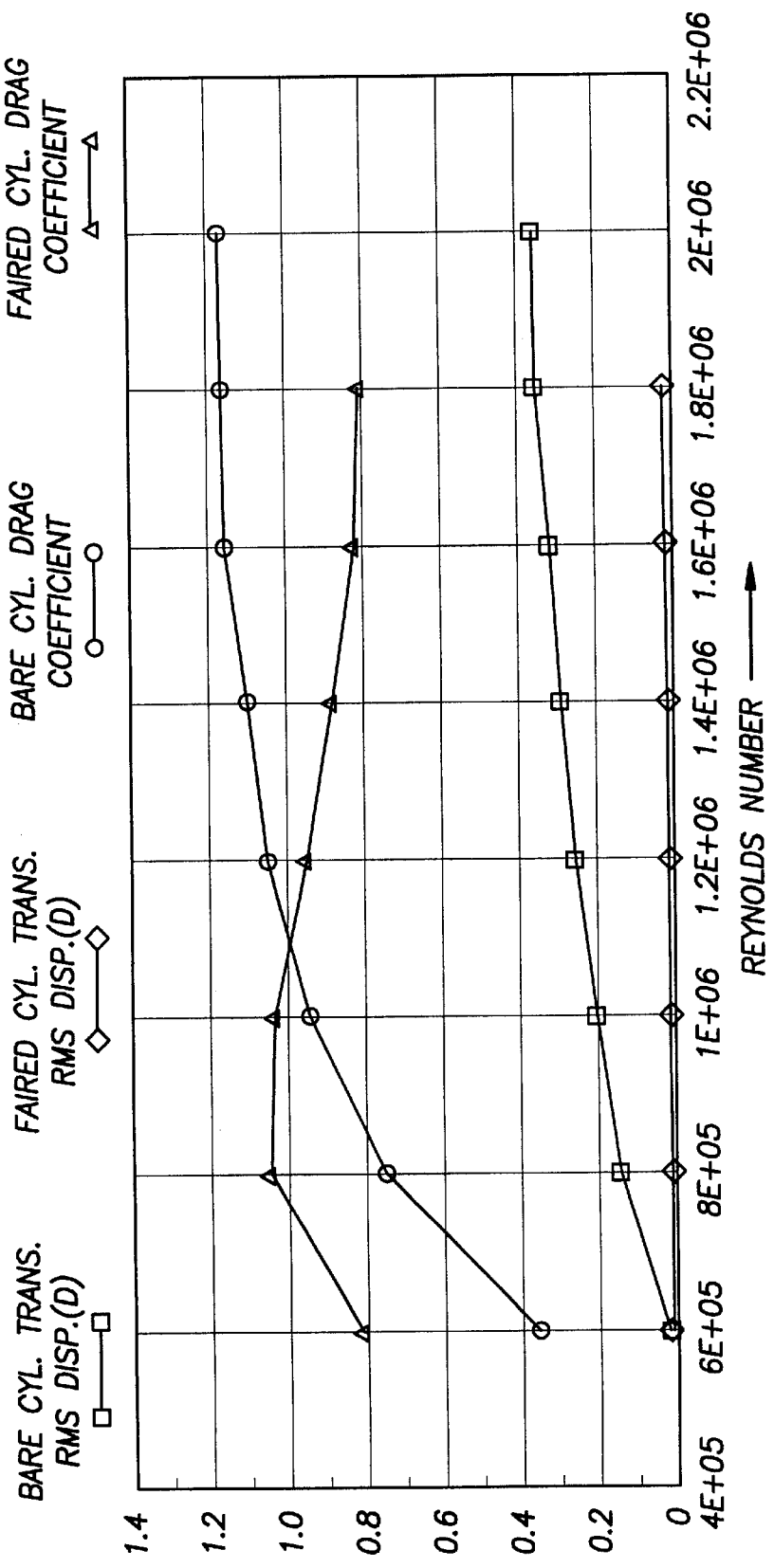
FIG. 7 is a graph of transverse RMS displacement and drag coefficient against Reynolds number for a 64 degree angle of attack.

FIGS. 5–7 illustrate test results demonstrating the surprising practicality and effectiveness of ultrashort fairings.

These tests were conducted in a tow tank environment with the marine element towed to develop relative motion between the test subject and the water. FIG. 5 illustrates transverse RMS displacement and drag coefficient as a function of Reynolds number for both unfaired cylinders and cylinders representing marine elements which have been fitted with an by ultrashort fairing. This particular test used a fairing with a chord to thickness ratio of 1.20 (including a tail) and an angle of attack of 0 degrees. Very significant improvement to both suppression of VIV excitement and drag was observed, despite this very short chord to thickness ratio.

FIG. 6 illustrates VIV excitement as transverse RMS displacement against Reynolds numbers for both an unfair cylinder and for an ultrashort fairing having the same configuration as that tested for FIG. 5. However, in this instance the angle of attack was varied from 0 to 64 degrees with sect to the faring orientation. Again, a baseline was run with an unfaired cylindrical element. Markedly improved VIV response was demonstrated throughout the range tested up to and including a relative current heading of 64 degrees.

FIG. 7 illustrates further investigation of response of this ultrashort configuration, relative to an unaired cylindrical element, at a 64 degree angle of attack. As noted above, VIV suppression remains effective. However, FIG. 7 also illustrates drag coefficients. At higher Reynolds numbers, the ultrashort fairing reduces drag relative to an unaired cylinder even with this 64 degree angle of attack. Compare, however, the enhanced drag reduction resulting from greater alignment, see FIG. 5.

Although disclosed in substantially fixed, non rotative embodiments above, it should be understood that ultrashort fairings may be deployed to normally weathervane into the current. In such applications, effective VIV suppression is still provided by fairings which retain ease of handling, and provide for mitigation of negative effects should the harsh marine environment cause the normally rotative fairing to seize-up.

Other modifications, changes, and substitutions are also intended in the forgoing disclosure. Further, in some instances, some features of the present invention will be employed without a corresponding use of other features described in these illustrative embodiments. Accordingly, it is appropriate that the appended claims be construed broadly and in a manner consistent with the spirit and scope of the invention herein.

What we claim is:

1. An ultrashort fairing for suppressing vortex-induced vibration of a substantially cylindrical marine element, the ultrashort fairing having dimensions of thickness and chord length and comprising:
    a leading edge substantially defined by the circular profile of the marine element for a distance following at least 270 degrees; and
    a pair of shaped sides departing from the circular profile of the marine element and converging at a trailing edge;
    wherein the chord to thickness ratio for the ultrashort fairing is in the range of less than 1.20 to about 1.10.

2. An ultrashort fairing in accordance with claim 1 wherein the marine element is a spar hull.

3. An ultrashort fairing in accordance with claim 1 wherein the marine element is a drilling riser.

4. An ultrashort fairing in accordance with claim 1 wherein the marine element is a leg supporting a platform.

5. An ultrashort fairing in accordance with claim 1 wherein the marine element is a tendon of a tension leg platform.

6. An ultrashort fairing in accordance with claim 1 wherein the marine element is a production riser.

7. An ultrashort fairing in accordance with claim 1 wherein the marine element is a offshore export riser.

8. An ultrashort fairing in accordance with claim 1 wherein the shaped sides extend substantially tangentially from the outer surface of the marine element and are substantially flat.

9. An ultrashort fairing in accordance with claim 1 wherein the shaped sides present a convex surface on their exterior in which the convex curve extends parallel to the axis of the marine element.

10. An ultrashort fairing in accordance with claim 1 wherein the shaped sides present a concave surface on their exterior in which the concave surface extends parallel to the axis of the marine element.

11. An ultrashort fairing in accordance with claim 1 wherein the fairing is integrally formed with the marine element.

12. An ultrashort fairing in accordance with claim 1 wherein the fairing is fixedly secured to the marine element in a non-rotative connection.

13. An ultrashort fairing in accordance with claim 1 wherein the shaped sides converge at the trailing edge which is not further extended from the axis of the marine element.

14. An ultrashort fairing in accordance with claim 1 further comprising a tail extending from the trailing edge, the length of which is included in the chord dimension.

15. A non-rotatable ultrashort fairing for suppression of vortex-induced vibration of a marine element having a circular cross section, the ultrashort fairing comprising:
    shaped sides that extend essentially tangentially from the outer surface of the marine element toward a trailing edge;
    a means to fix the ultrashort fairing to the marine element so that the ultrashort fairing cannot rotate around the marine element, wherein the maximum length of the cross section of the combined ultrashort fairing and marine element is in the range of less than 1.20 to about 1.10 times the outside diameter of the marine element, and the ultrashort fairing is made from a flat sheet of material, wrapped around the marine element, and edges of the flat material connected at the centerline of the ultrashort fairing.

16. A method of protecting a substantially cylindrical marine element from vortex-induced vibration comprising installing a plurality of ultrashort fairing about the marine element in a non-rotative manner along the axis of the marine element and aligned in the direction of the prevailing significant currents, whereby the marine element is protected from vortex-induced vibrations from currents having an angle of attack of plus or minus 64 degrees with respect to said fairing.

17. A method for protecting a substantially cylindrical marine element from vortex-induced-vibration in accordance with claim 16, further comprising controlling drag on the marine element by using ultrashort fairings each having chord and thickness dimensions, a leading edge substantially defined by the circular profile of the marine element for a distance following at least 270 degrees of the circumference of the marine element, and a pair of shaped sides whose exterior surface departs from the circular profile of the marine riser and converging at a trailing edge; in which the chord to thickness ratio for the ultrashort fairing is between about 1.20 and 1.10.

* * * * *